(12) United States Patent
Trifoni et al.

(10) Patent No.: US 11,752,587 B2
(45) Date of Patent: Sep. 12, 2023

(54) LOCATING SYSTEM FOR MACHINE TOOLS AND LOCATING METHOD PROVIDED BY SAID SYSTEM

(71) Applicant: SPRINGA S.r.L., Milan (IT)

(72) Inventors: Alessandro Trifoni, Bologna (IT); Davide Cevoli, Castelmaggiore (IT); Denis Mosconi, Rimini (IT); Lorenzo Frangi, Barlassina (IT)

(73) Assignee: SPRINGA S.R.L., Milan (IT)

( * ) Notice: Subject to any disclaimer, the term of this patent is extended or adjusted under 35 U.S.C. 154(b) by 206 days.

(21) Appl. No.: 17/023,690

(22) Filed: Sep. 17, 2020

(65) Prior Publication Data

US 2021/0086321 A1 Mar. 25, 2021

(30) Foreign Application Priority Data

Sep. 19, 2019 (IT) .......................... 102019000016778

(51) Int. Cl.
*B23Q 17/22* (2006.01)
*B23Q 9/00* (2006.01)

(52) U.S. Cl.
CPC ........... *B23Q 17/22* (2013.01); *B23Q 9/0007* (2013.01); *B23Q 2717/006* (2013.01)

(58) Field of Classification Search
CPC .................. B23Q 17/22; B23Q 9/0007; B23Q 2717/006; B23Q 17/2233; B23Q 17/00; B23Q 2717/00; B23C 3/00; B23C 5/10
See application file for complete search history.

(56) References Cited

U.S. PATENT DOCUMENTS

| 9,121,146 B2 * | 9/2015 | Paulsen ................... G01S 17/88 |
| 2004/0174168 A1 * | 9/2004 | Brune ................... E21B 47/092 |
| | | 324/329 |
| 2005/0024331 A1 * | 2/2005 | Berkley ................ A61B 34/71 |
| | | 345/157 |

(Continued)

FOREIGN PATENT DOCUMENTS

| CN | 205919806 U | * 2/2017 |
| EP | 3403761 A | 11/2018 |

(Continued)

*Primary Examiner* — Alicia M. Choi
(74) *Attorney, Agent, or Firm* — Vorys, Sater, Seymour and Pease LLP (57) ABSTRACT

Locating system for machine tools including a machine tool for working on a object's machining surface by removing material and movement apparatus for placing in direct contact with the machining surface and for moving the machine tool with respect to the object while the tool works on the object, at least two locating apparatuses each including supporting portion for placing at a fixed point on the machining surface, detector including first cable or second cable for connecting the locating apparatus to the machine tool, and a locating portion to release or receive the cable to measure distance detected between the machine tool and locating apparatus. The detector is configured to allow mutual connection of the locating apparatuses to allow direct measurement of distance between locating apparatuses and distance is further obtainable indirectly from the distances detected by the detector between the machine tool and locating apparatuses.

13 Claims, 7 Drawing Sheets

(56) References Cited

U.S. PATENT DOCUMENTS

| | | | | |
|---|---|---|---|---|
| 2008/0115856 A1* | 5/2008 | Altenhoner | ............ | B23Q 17/24 |
| | | | | 144/136.1 |
| 2017/0239768 A1* | 8/2017 | Frangi | ................ | B23Q 17/2414 |
| 2018/0133860 A1* | 5/2018 | Fujita | ................... | G05B 19/404 |
| 2020/0282588 A1* | 9/2020 | Rusch | .................... | B23D 47/12 |
| 2020/0331107 A1* | 10/2020 | Kim | ..................... | G05B 19/402 |

FOREIGN PATENT DOCUMENTS

| | | | |
|---|---|---|---|
| JP | 5665008 B1 * | 2/2015 | |
| WO | 2016051342 A | 4/2016 | |

\* cited by examiner

LOCATING SYSTEM FOR MACHINE TOOLS AND LOCATING METHOD PROVIDED BY SAID SYSTEM

CROSS-REFERENCE TO RELATED APPLICATIONS

Applicant claims the benefit of Italian patent application number IT 102019000016778 filed Sep. 19, 2019, incorporated herein by reference.

FIELD OF THE INVENTION

The present invention relates to a locating system for machine tools, comprising: a machine tool suitable for working on a machining surface of an object by removing material and including a tool, movement means suitable to be placed in direct contact with the machining surface and for moving the machine tool and, therefore, the tool with respect to the object while the tool works on the object, at least two locating apparatuses each including a supporting portion suitable to be placed at a fixed point on the machining surface, detection means comprising a first cable or a second cable designed to connect the locating apparatus to the machine tool, and a locating portion configured to release or receive the cable in such a way as to measure the distance detected between the machine tool and the locating apparatus.

BACKGROUND OF THE INVENTION

In particular, the device object of the present invention is a system in which the movement of a machine tool during machining is directed by a computer that controls the movements and functions thereof according to a well-defined work programme.

As is known, machine tools can be, among others, lathes, drills, sanders, milling machines, depending on the type of machining or tool, and usually include a workpiece holder table, to which the object to be machined is attached, and a spindle associated with the tool for the machining.

The operation of these machines requires the operator to place the object on the workpiece holder table, attach a tool to the spindle, position the spindle and the tool relative to one another, start the spindle, and then move the object to be machined and/or the spindle along a straight guide.

The described prior art has a few major drawbacks.

A first drawback is that, in order to work on shapes or profiles that are not straight, the movement of the tool or the piece to be worked is performed manually by the operator who must thus have great experience and manual skills.

Another drawback is the high danger of the machining process and, therefore, the fact that the operator can be seriously injured.

This drawback is further increased by the fact that the safety guard is often removed to improve the view of the cutting or blade.

A further drawback is that the operator, in order to perform different machining processes, must both purchase several machines, thus increasing production costs, and move the object to and from several machines, thus increasing machining times.

The aforementioned drawbacks are solved by the increasingly frequent use of numerical control machines which identify a fixed station on which to perform different machining processes without moving the object to be worked.

Numerical control machines have a protective body containing the various components and defining a machining chamber; an interface external to the body through which to define the machining process to be performed; a workpiece loading system designed to introduce and extract the object to be worked into and from the machining chamber; several spindles on which the machining tools are mounted; and tool-changing systems.

Lastly, the spindles are equipped with a movement system which, by translating or rotating the spindle with respect to the object, allows the execution of a chosen machining process.

These machines, while representing an improvement over the traditional machine tools described above, still have some major drawbacks.

A first major drawback is the limited size of an object that can be worked by these machines since, as it has to be introduced into the machining chamber, it cannot have large dimensions.

Another drawback is that numerical control machines exhibit high construction complexity, and therefore high purchase and maintenance costs.

Another drawback is represented by the high energy consumption of these machines which, together with the aforementioned high purchase and maintenance costs, make the pieces thus produced particularly expensive.

A further drawback is that numerical control machines require the operator to have advanced knowledge of the machine and the programming language, and therefore are complex to program and use.

The machine tool described in patent application WO-A-2016051342 describes a device capable of partially overcoming the aforementioned drawbacks.

In particular, the device is characterised in that it has small dimensions and is available above the part being machined, without limits from the point of view of the dimensions of the part and without creating visual obstructions in reference to the machining path.

This device therefore allows a predetermined machining path to be followed or the machining parameters to be set in real time, so as to guide the device along the surface of the particular object to be cut.

However, the aforementioned technique still suffers from at least one major drawback.

In detail, the device described in patent application WO-A-2016051342 allows a general user to guide the device on the basis of "absolute" directions and parameters.

"Absolute" means that each distance travelled in terms of direction and intensity is solely referred to a starting point or reference system coinciding with the point where the device is preliminarily placed by the user for the machining process. However, there is no reference with respect to the reference system defined by the part being machined and therefore it is not possible to control the tool relative to the support surface.

The lack of indications relating to the surface of the part being machined therefore makes it impossible to automatically determine the position of the device on the work surface.

In order to overcome the latter technical problem, some measures have been taken, which are described in patent application EP-A-17172084.

In particular, in the aforementioned patent application, the positioning system involves the use of locating turrets, which can be positioned at certain predetermined points on the work surface and are designed to release a cable connected to the machine tool, through which some quantities useful for localization can be deduced.

In particular, the system makes it possible to deduce the orientation of the cable with respect to the orientation of the machine tool, thanks to an encoder rotating integrally with the tensioned cable loosely attached to the machine tool, and the distance between the turrets and the machine tool.

The above prior art partially solves the problem of locating the machine tool with respect to the absolute reference system; however, it too has some major drawbacks.

In particular, it has been found that, although easy to manufacture, cable systems such as the one described, if configured as described, can lead to errors in measuring the position of the machine tool which are absolutely not negligible.

Errors can in fact be in the order of millimetres, substantially resulting in a net decrease in efficiency since the machine tool is used for precision machining.

Furthermore, a system as described in the aforementioned application has the great drawback of depending, in terms of precision, on the winding and unwinding of the cable connecting the turret to the tool. Any unwanted overlapping of the cable on the measuring reel of the turrets can lead to measurement errors that can extend even beyond millimetres.

Furthermore, the system of the prior art has no possibility of understanding whether and to what extent the measurement differs from the real positioning value.

SUMMARY OF THE INVENTION

In this context, the technical task underlying the present invention is to devise a locating system for machine tools and a locating method provided by said system, which are capable of substantially obviating at least some of the above-mentioned drawbacks.

Within the scope of said technical task, a major object of the invention is to obtain a locating system for machine tools and a related locating method, which allow the absolute position of the machine tool machining a surface to be determined autonomously.

Another major object of the invention is to provide a locating system for machine tools and a related locating method, which allow the positioning of the machine tool to be determined in a simple, easily and rapidly repeatable manner.

In particular, a further task of the invention is to increase the precision in detecting the position of the machine tool, without excessive impact on the system manufacturing costs.

The technical task and the specified objects are achieved by means of a locating system for machine tools, comprising: a machine tool suitable for working on a machining surface of an object by removing material and including a tool, movement means suitable to be placed in direct contact with the machining surface and for moving the machine tool and, therefore, the tool with respect to the object while the tool works on the object, at least two locating apparatuses each including a supporting portion suitable to be placed at a fixed point on the machining surface, detection means comprising a first cable or a second cable designed to connect the locating apparatus to the machine tool, and a locating portion configured to release or receive the cable in such a way as to measure the distance detected between the machine tool and the locating apparatus, the detection means being configured to also allow mutual connection of said locating apparatuses in such a way as to allow the direct measurement of the distance between said locating apparatuses, the distance being further obtainable indirectly from the distances detected by the detection means between the machine tool and the locating apparatuses.

BRIEF DESCRIPTION OF THE DRAWINGS

The features and advantages of the invention will be apparent from the detailed description of preferred embodiments of the invention, with reference to the accompanying drawings, in which:

FIG. 5a shows a top view of a locating apparatus in a locating system according to the invention arranged on an object;

FIG. 5b is a perspective view of the locating apparatus in FIG. 5a;

FIG. 6 is a cross-sectional view of a locating apparatus in a locating system according to the invention, highlighting the attaching portion of the detection means in a preferred embodiment;

FIG. 7a shows the detail of a cross section of the locating portion of a detection apparatus in a preferred configuration according to the invention;

FIG. 7b shows the detail of a lateral section of the locating portion in FIG. 7a;

FIG. 8 is the detail of the first device 80 and the second device 81 that allow the winding and/or release of the detection means in a controlled manner within a locating apparatus of a system according to the invention;

DESCRIPTION OF THE PREFERRED EMBODIMENTS

Herein, the measures, values, shapes and geometric references (such as perpendicularity and parallelism), when used with words like "about" or other similar terms such as "approximately" or "substantially", are to be understood as except for measurement errors or inaccuracies due to production and/or manufacturing errors and, above all, except for a slight divergence from the value, measure, shape or geometric reference with which it is associated. For example, if associated with a value, such terms preferably indicate a divergence of no more than 10% from the value itself.

Furthermore, when used, terms, such as "first", "second", "higher", "lower", "main", and "secondary" do not necessarily identify an order, relationship priority, or relative position, but they can simply be used to distinguish different components more clearly from one another.

Unless otherwise stated, the measurements and data reported in this text shall be considered as performed in International Standard Atmosphere ICAO (ISO 2533:1975).

With reference to the Figures, the locating system for machine tools according to the invention is indicated as a whole by number 1.

The system 1 preferably comprises a machine tool 1a and at least one locating apparatus 1b.

The machine tool 1a is preferably suitable to be used to remove or add material from or to a preferably substantially flat machining surface 10a of an object 10 in order to remove material, for example forming grooves, holes, slots, or to cut the object or draw shapes on the object or paint some parts of it. In particular, the object 10 is a board, preferably made of wood. The object 10 or workpiece therefore has dimensions and a surface generally less than 100 m$^2$.

The object 10 can be made of wood, paper, cardboard, fabric or metal.

The machine tool 1a therefore comprises at least one removal tool 2; movement means 3 suitable to be placed in direct contact with the surface 10a and to move the removal tool 2 and the machine tool 1a with respect to the object 10; a case 4 with which the removal tool 2 and the means 3 are associated; and a power supply (a battery and/or cables for connection to an external network) designed to power the components of the machine tool 1a.

The removal tool 2 is therefore a cutting and/or drilling tool designed to remove material by melting, evaporation, or preferably by removing chips. It can therefore be a tool in rotation, in reciprocating motion, or a laser, a water-jet cut, or so on. It is preferably a small tool, i.e. a tool that removes material from a surface area of less than one dm$^2$, preferably of less than one cm$^2$.

The object 10 is therefore in direct contact with and supports the movement means 3 during the machining process, and the exchange of forces during the machining process takes place directly between the object 10 and the movement means 3.

It can include a stator part 21; a spindle 22, preferably an electro-spindle, defining a work axis 22a; and a tool 23 suitable to be attached to the spindle 22 so as to rotate around the work axis 22a and remove material.

The tool 23 can be a drill bit, therefore the removal tool 2 can be a drill. Alternatively, the tool 23 can be a milling cutter, therefore the removal tool 2 can be a milling machine.

The movement means 3 comprise drive wheels defining a main axis of rotation 3a and the machine tool 1a has a control unit 5 designed to control at least the removal tool 2, hence the removal process, and the drive wheels, hence the movement of the machine tool 1a along a removal path 2a along which material is removed.

It should be noted that, if provided with a control unit, the machine tool 1a is identifiable as a numerical control machine tool.

Furthermore, the control unit 5 does not provide for any operators to be on board the machine tool 1a, whose size is too small to accommodate an operator since it preferably machines an object 10 with reduced dimensions.

Preferably, the movement means 3 include a plurality of drive wheels, and to be more precise, for example three drive wheels having main axes of rotation 3a mutually almost equally angularly spaced at about 120°.

Each drive wheel includes a base body 31, which preferably is almost cylindrical, has an extension axis almost coinciding with the axis of rotation 3a and is designed to rotate around the same axis 3a; rolling elements 32 idly hinged at the side surface of the base body 31 so as to be interposed between the body 31 and the surface 10a, thereby coming into direct contact with the same surface 10a; a motor 33, specifically an electric motor, designed to control the rotation of the base body 31 around the axis 3a; and in some cases, an encoder designed to monitor the motor 33.

The rolling elements 32, hinged to the base body 31, are placed along at least one circumference which is almost concentric with the axis of rotation 3a and has idle axes of rotation lying on a substantially transverse plane, in particular almost perpendicular to the main axis of rotation 3a. Preferably, the elements 32 are placed on a plurality of circumferences (specifically three) of equal radius and mutually angularly offset between adjacent circumferences, so as to always have a correct contact between the rolling elements 32 and the machining surface 10a. The rolling elements 32 are rollers, specifically conical or barrel rollers.

Preferably, the drive wheels 3 are so-called "omni wheels" known per se.

The case 4 is designed to support the various components of the machine tool 1a. It comprises a base plate 41 suitable to be arranged proximal and parallel to the surface 10a and with which the control unit 5 and the movement means 4 are associated; a casing 42 associated with the base plate 41 and defining a volume for housing at least the unit 5; and an attachment 43 designed to attach the removal tool 2 to the case 4 by arranging the work axis 22a suitably almost perpendicular to the machining surface 10a when the machine tool 1a is working. In some cases, the case 4 may comprise handles protruding from the base plate 41 and/or from the casing 42 on the side opposite the surface and designed to allow an operator to operate manually.

The base plate 41 can have dimensions substantially less than 0.5 m, specifically less than 0.3 m, whereas the casing 42 can have a height, as calculated perpendicular to the base plate 41, substantially less than 0.3 m, specifically less than 0.2 m.

The attachment 43 includes a vertical plate 431 suitable to be arranged almost perpendicular to the surface 10a; at least one coupling 432 suitable to attach the stator part 21 to the vertical plate 431, and a horizontal plate 433 suitable to be arranged almost parallel to the surface 10a and on which the stator part 22a rests and having a through hole 43d at least equal to the cross-section of the spindle 22 so that the spindle 22 and the tool 24 protrude from the horizontal plate 433, thus facing the object 10.

The coupling 432 is suitably of the clamp type and can comprise two contrast elements 432a, for example substantially C-shaped, suitable to be placed on the opposite side with respect to the stator part 21, and a clamp 432b, for example a bolt, by means of which the contrast elements 432a can be tightened to the stator part 21.

In some cases, between the attachment 43 and the rest of the case 4, the machine tool 1a may comprise auxiliary movement means suitable for moving the attachment 43 and the removal tool 2 with respect to the rest of the case 4, therefore to the machining surface 10a.

The auxiliary movement means, not shown in the figure, can comprise a vertical mover suitable to vary the distance of the removal tool 2 from the surface 10a by means of a translation, preferably substantially parallel to the work axis 22a; and/or a rotational mover designed to rotate the removal tool 2 around an axis substantially parallel to the machining surface 10a and almost perpendicular to the work axis 22a by varying the inclination between the work axis 22a and the surface 10a.

The control unit 5 is suitable to control the drive wheels 4 independently of each other along the removal path 2a.

It is also suitable to define the removal by controlling the auxiliary movement means and the removal tool 2, and in particular the spindle 22 according to the removal parameters.

The control unit 5 includes a control board connected to the removal tool 2 and to the drive wheels and provided with a memory and interface means, such as a USB port, Wi-Fi communication devices, or even Bluetooth™, by means of which the operator can enter and store in said memory the removal parameters, and in some cases the path 2a.

It should be noted that in the memory there is a movement database that associates any type of movement (straight, arched, elliptical, etc.) with a speed and a direction of rotation of each drive wheel around its main axis of rotation 3a.

The control unit 5 preferably consists of a microcomputer, for example a microcomputer of the Arduino® or Raspberry® type and can be designed to be operatively connected and communicate via cable or other means with an external electronic processor such as, for example, a common computer.

The machine tool 1a further comprises at least one detection apparatus 6.

The detection apparatus 6 is preferably arranged on the top of the machine tool 1a.

Furthermore, the detection apparatus 6 is designed to be operatively connected to detection means 7. The detection means 7 can be of various kinds; in particular, preferably, they include point-to-point connection devices such as, for example, a cable or a rope, for example made of polymeric or metallic material so as to allow connection between two separate points in space and allow reciprocal movement of the same points.

In fact, preferably, the detection means 7 are substantially suitable to reciprocally connect the machine tool 1a and at least part of the locating apparatus 1b. The latter substantially define the points connected by the detection means 7.

The detection apparatus 6 is also electrically connected, for example, to the control unit 5 so as to be able to exchange information with it.

The apparatus 6 defines a first axis 6a. The first axis 6a is preferably an axis around which at least part of said apparatus 6 can rotate.

Therefore, the detection apparatus 6 can comprise a shaft 6b centred along the axis 6a and suitable to movably attach some elements around itself.

The shaft 6b, for example, can be attached to the case 4.

In particular, the detection means 7 are designed to rotate around the shaft 6b integral with the case 4, i.e. around the axis 6a.

The apparatus 6 therefore preferably comprises a first element 60, a second element 61 and a third element 62.

Preferably, the first element 60 is a first portion movably attached to said case 4, or more conveniently to the shaft 6b. The first element 60 can therefore comprise bearings designed to allow its easy rotation around the shaft 6b, and in particular around the first axis 6a. Said first element 60 is preferably a rotating component to which it is possible to attach at least part of the detection means 7.

The detection means 7 preferably include at least a first cable 70.

Preferably, therefore, the first element 60 is substantially a ring which can be attached, along the perimeter, to the first cable 70.

Preferably, the first element 60 is suitable to allow the first cable 70 to rotate around the shaft 6b, and in particular around the first axis 6a.

Furthermore, the first element 60 rotates integrally with the rotation driven by the first cable 70.

Figure 1:
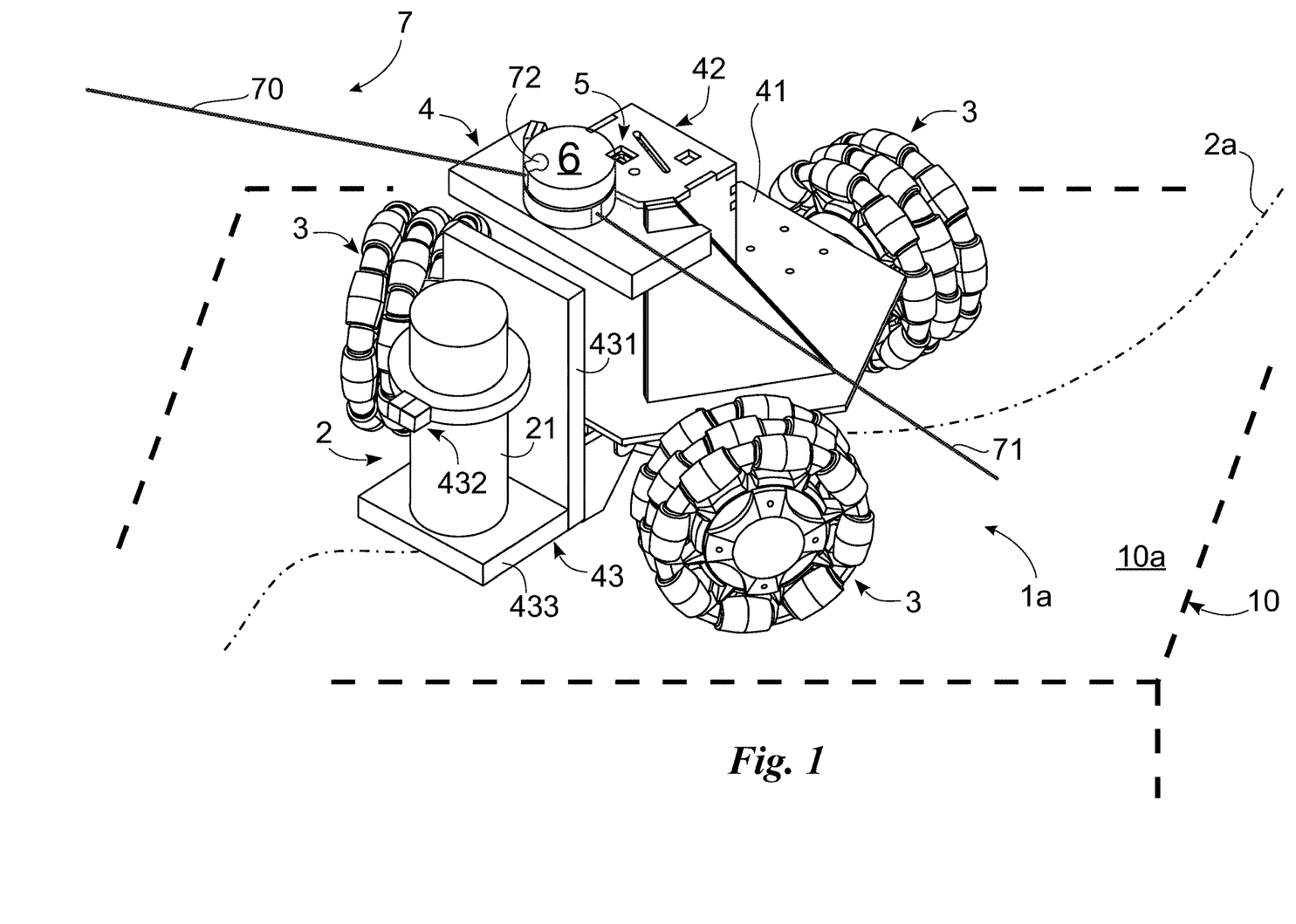
FIG. 1 shows an axonometric projection of a machine tool in a preferred configuration according to the invention during machining.
Figure 2:
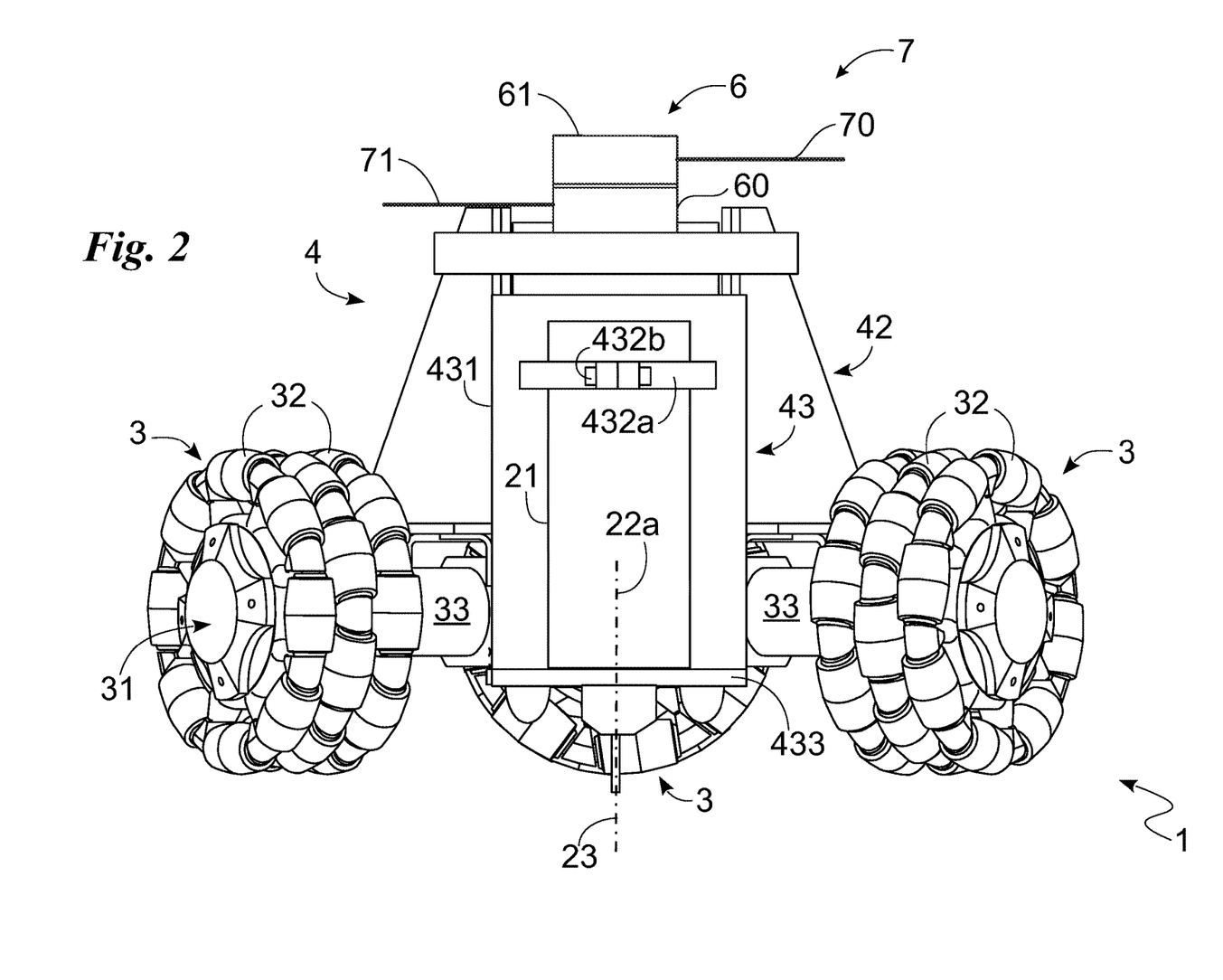
FIG. 2 is a front view of a machine tool in a preferred configuration according to the invention.
Figure 3:
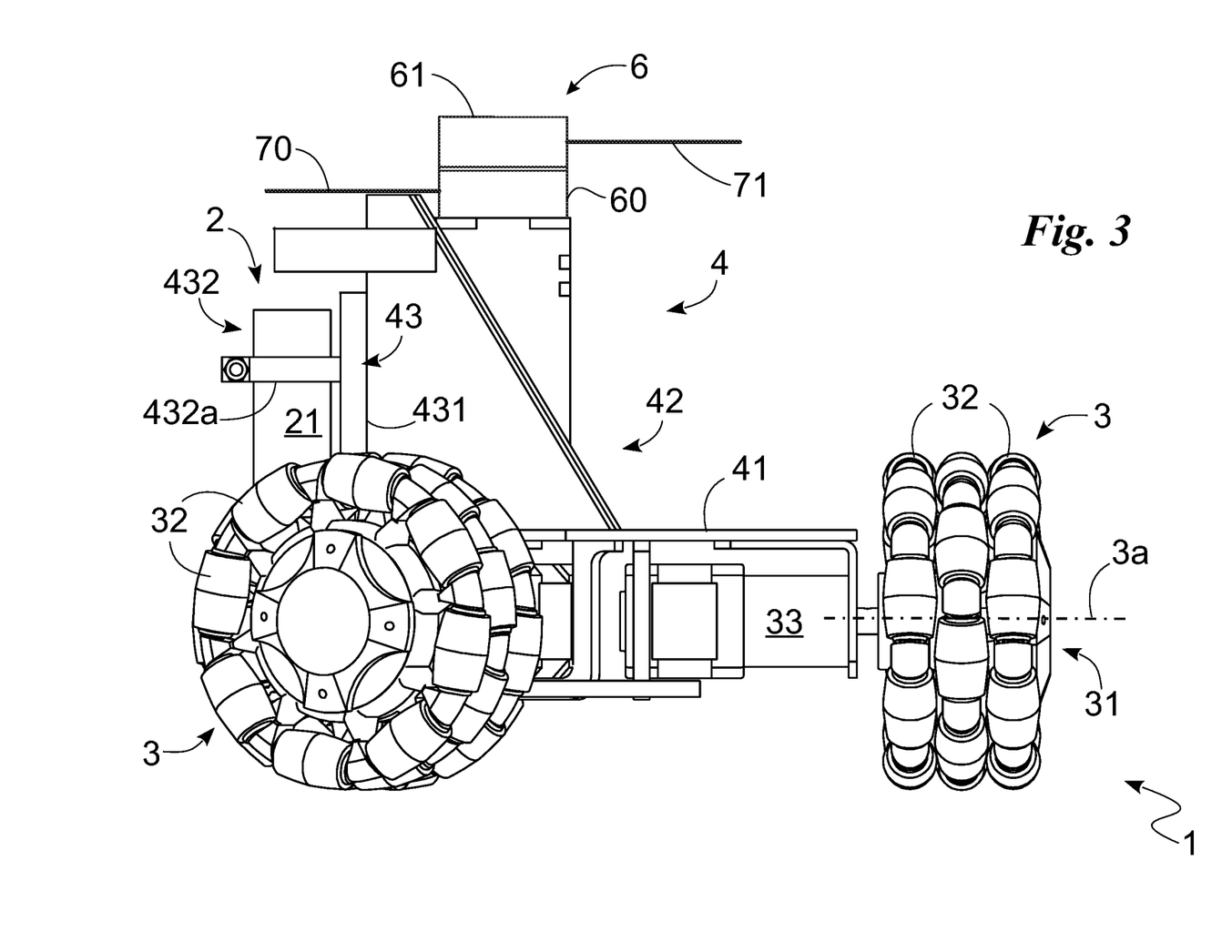
FIG. 3 is a side view of the machine tool in a preferred configuration according to the invention.
Figure 4A:
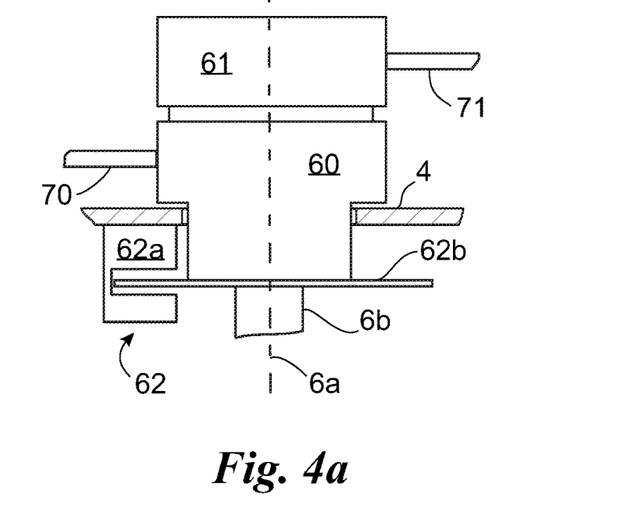
FIG. 4a represents in detail the detection apparatus in a preferred configuration according to the invention.
Figure 4B:
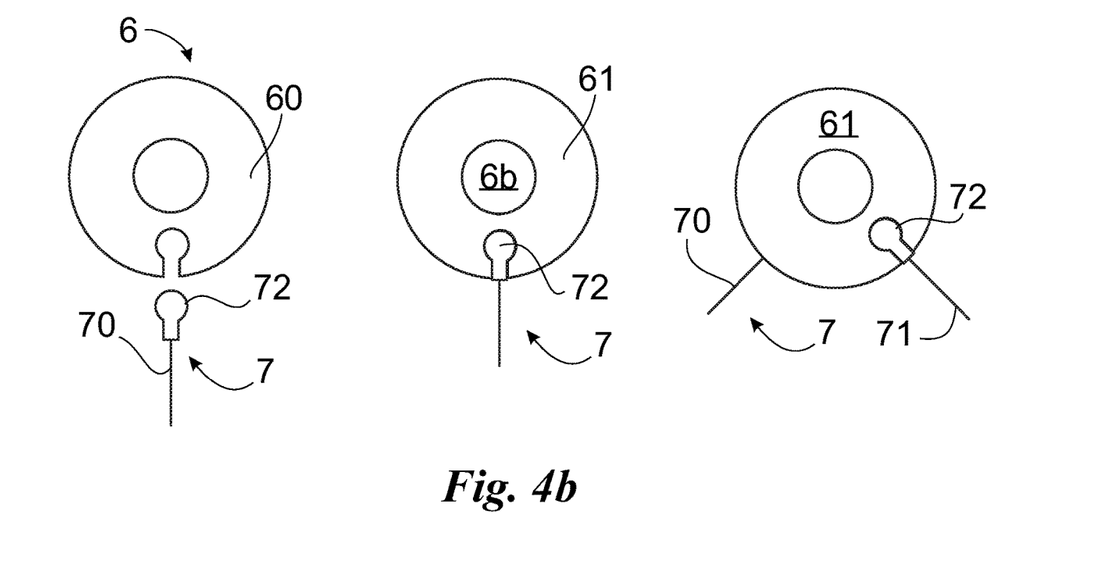
FIG. 4b shows a schematic top view of the detection apparatus in a preferred configuration according to the invention.

Preferably, therefore, the first cable 70 can be resolvably attached to the first element 60 in an integral manner. This attachment can be guaranteed, for example, by known resolvable joints, for example as shown in FIG. 4b.

In general, preferably, the detection means 7 comprise at least one attaching portion 72. The attaching portion 72 is preferably arranged at the free end of the detection means 7, i.e. at the free end, for example, of the first cable 70.

The attaching portion 72 is substantially configured to be attached to the detection apparatus 6 and can include simple elements that can be fitted, for example, in the first element 60, or it can include a slot inside which a protuberance of the first element 60 can be trapped.

The second element 61 preferably has the same features as the first element 60. This second element 61 may not necessarily be present in the detection apparatus 6 and the latter may be provided solely with the first and the third element 60, 62. The second element 61, in fact, is therefore an additional element preferably resolvably attached to a second cable 71. The second cable 71 is preferably also part of the detection means 7 and has the same features as the first cable 70. It too can include an attaching portion 72 that can be attached to the second element 61 and defines features similar to those already described.

Basically, the second element 61 has the same functions as the first element 60 so as to allow the machine tool 1a to be connected to a plurality of locating apparatuses 1b.

In fact, for example, if the detection apparatus 6 also included a third element similar to the first and the second element 60, 61, it would be possible to connect the machine tool 1a to three locating apparatuses 1b. However, essentially, it is preferable for the detection apparatus 6 to substantially include a first and a second element 60, 61.

For example, therefore, the second element 61 can also comprise bearings designed to allow its easy rotation around the shaft 6b, and in particular around the first axis 6a.

Preferably, the first and the second element 60, 61, respectively, are therefore moved by the first cable 70 and the second cable 71 with respect to external locating apparatuses 1b.

Furthermore, the angle between the two cables 70 and 71 can be assessed through sensor means of a known type, which are capable of recording the angular deviation α between the elements 60, 61, specifically between the cables 70 and 71.

This information can then be supplied by the sensors to the control means 5. Therefore, any sensor means are preferably operatively connected to the control means 5. This connection can be ensured through common cable connections or wireless connections.

Sensor means of this type can be an encoder or similar elements. Preferably, the third element 62 is at least partially attached to the first element 60 so as to be able to detect the movements of said first element 60.

Preferably, in particular, the third element 62 is designed to detect the difference in orientation between the case 4 and at least the first element 60, if necessary, also the second element 61.

In detail, the third element 62 is at least suitable to detect the angle φ.

Preferably, therefore, it is possible to define, by means of the case 4, a predetermined orientation 4a substantially coinciding with the orientation of the machine tool 1a and at least detect the deviation of the first cable 70 with respect to said predetermined orientation 4a.

The angle φ, therefore, is preferably the angle between the predetermined orientation 4a of the machine tool 1a and the first cable 70 connected to the first element 60.

Therefore, the third element 62 is designed to detect the orientation of the machine tool 1a with respect to the direction of the first cable 70, i.e. the angular difference between the predetermined orientation 4a and the first cable 70, and vice versa.

Of course, as already mentioned, the angular difference, i.e. the orientation, between the second element 61 and the case 4 can also be assessed. This difference can be assessed directly, if the third element 62 also operatively connects the case 4 and the second element 61; otherwise, the orientation of the second cable 71 can be indirectly deduced as the difference between the angular deviation α and the angle φ.

In order to define the aforementioned angles, preferably, the third element 62 consists of at least two portions which move respectively integrally with the case 4 and with one of the first and the second element 60, 61, so as to detect their reciprocal movement, in particular around the axis 6a.

Such portions are, for example, at least of a detector 62a and in a disc 62b.

The disc 62b is preferably suitable to be attached to the first element 60 so as to rotate integrally therewith around the shaft 6b and the first axis 6a.

The detector 62a is preferably a sensor, for example of the optical type, designed to detect the angle of rotation of the disc 62b, and consequently of the first element 60.

Of course, the detection apparatus 6 could also include a second disc 62b attached to the second element 61 so as to directly determine the rotation of the latter with respect to the case 4.

In the preferred embodiment, preferably, the first cable 70 attached to the first element 60, by rotating integrally with the first element 60, defines a plurality of angles φ which can be recorded by the third element 62.

As already mentioned, each angle φ is preferably defined as the difference between the predetermined orientation 4a of the machine tool 1a and the direction determined by the detection means 7.

Preferably, the third element 62 is substantially an encoder designed to detect the positions of the disc 62b with respect to the detector 62a.

Therefore, preferably, the third element 62 is suitable to allow the control unit 5 to assess the orientation of the machine tool 1a at least with respect to the direction of the first cable 70.

Of course, the angular deviation α can be obtained by means of the presence of two sensors similar to the third element 62 and by adding the measurements of the angles φ detected for both cables 70, 71 with respect to the predetermined orientation 4a.

The locating system 1 additionally comprises, as said, at least one locating apparatus 1b.

Such locating apparatus 1b preferably comprises a supporting portion 9 and a locating portion 8.

The supporting portion 9, for example, is the portion of the apparatus 1b suitable to be placed on the object 10, and more appropriately, on the machining surface 10a.

Preferably, the supporting portion 9 therefore comprises at least a base 90 and locking means 91.

The base 90 preferably defines at least one supporting surface 90a compatible with the machining surface 10a.

Therefore, the supporting surface 90a, for example, is a flat surface.

The base 90 can also consist of various materials such as wood or metal or polymers.

For example, the base 90 could also be made of polymethyl methacrylate so as to allow a user to view the supporting surface 90a from the outside.

The locking means 91 are preferably configured to lock or attach the supporting portion 9 to the object 10. In particular, preferably, the locking means 91 are configured to lock the base 90 along the supporting surface 90a on the machining surface 10a.

In this way, substantially, the locating apparatus 1b defines one of the fixed connection points for the detection means 7.

Furthermore, the supporting portion 9 can also comprise pointing devices. If present, the pointing device can comprise an emitter designed to mark one or more points on the supporting surface 10a.

Therefore, the emitter 91a can comprise a laser device or a plurality of LEDs designed to concentrate a light beam in one or more points of the supporting surface 90a.

In particular, the beam can define the positioning centre of the locating apparatus 1b with respect to the object 10, and consequently to the supporting surface 10a. However, the pointing device may consist of a simple target printed on the base 90 so as to allow a user to align the machining surface 10a with the target lines.

Or, preferably, the base 90 can have an arrow or angle shape along the supporting surface 90a so as to create a sort of structural pointer which can then be locked thanks to the locking means 91.

The locking means 91, in detail, can include a vice of a known type designed to be opened or closed in such a way as to stably fasten the locating apparatus 1b to the object 10. Or they may include known types of screw systems.

The locating portion 8 is preferably attached to or in one piece with the supporting portion 9.

Preferably, the locating portion 8 defines a turret with a variable height suitable to receive or release at least part of the detection means 7.

Preferably, in fact, the locating apparatus 1b includes said detection means 7. Therefore, the locating portion 8 is preferably connected to the machine tool 1a by means of the detection means 7, for example the first cable 70, which also allow the localization of the machine tool 1a on the machining surface 10a.

The locating portion 8 preferably comprises a first device 80, a second device 81 and a third device 82.

Preferably, said devices 80, 81, 82 are attached to a frame and are mutually connected by the detection means 7, in particular for example by the first cable 70 or the second cable 71.

The first device 80, for example, is an element loosely attached to the aforementioned frame and suitable to house at least part of the detection means 7. In particular, preferably, the first device 80 is configured to release or receive at least part of the detection means 7 in a controlled manner. Therefore, preferably, the first device 80 defines a reel around which the first or the second cable 70, 71 can be wound and which, for example by rotating, can release or receive the aforementioned cable 70, 71.

In particular, the first device 80 is suitable to receive or release the detection means 7 in opposition to or pushed by an elastic element. In this way, preferably, the cables 70, 71 are always tensioned in all the release and reception phases. Preferably, the first device 80 also comprises a sensor designed to detect the quantity of cable 70, 71 released or received.

Therefore, preferably, the first device 80 comprises a discoidal element 800 defining an axis of rotation 8a and a winding surface 8b extending around the axis of rotation 8a. In particular, the cable 70, 71 is wound around the axis of rotation 8a on the winding surface 8b and the latter is configured in such a way that the cable 70, 71 does not overlap. To allow this, for example, the winding surface 8b can extend along the axis of rotation 8a in such a way that the extension is equal to or greater than the diameter of the cable 70, 71 multiplied by the maximum number of turns that the cable 70, 71 can perform around the winding surface 8b without overlapping.

The discoidal element preferably rotates around the axis of rotation 8a with respect to the frame defined by the locating apparatus 1b so as to wind or release the cable 70, 71 on/from the winding surface 8b.

Furthermore, the first device 80 can comprise an elastic element 801 adapted to oppose the movement of the discoidal element 800 around the axis of rotation 8a. In this case, for example, the aforementioned sensor may consist of a revolution counter associated with the discoidal element 800, or more appropriately, an encoder designed to link the angle variation to the actual unwinding of the cable 70, 71.

The sensor can therefore be suitable to be operatively connected and communicate via cable or other means with an external electronic processor such as, for example, a common computer.

The second device 81 preferably comprises a transmission member designed to allow the passage of part of the detection means 7 from the first device 80 to the third device 82.

The second device 81, in particular, is operatively connected to the first device 80 in such a way as to collaborate with it to allow a controlled winding and unwinding of the detection means 7.

Preferably, in particular, the first device 80 and the second device 81 are integrally attached together, for example by means of the aforementioned frame, and at least part of the second device 81 is labile with respect to the first device 80 at least along a direction parallel to the axis of rotation 8a.

Preferably, the second device 81 is a cable winder.

Therefore, preferably, the second device 81 comprises at least one guiding support 810 and one guiding slider 811.

The guiding support 810 is preferably attached to the frame of the locating portion 8 so as to be integral with the first device 80 on the locating portion 8.

The guiding support 810 is preferably loosely attached to the guiding slider 811 so that the latter is at least movable along a translation direction 81a parallel to the axis of rotation 8a.

In particular, the guiding support 810 can be a threaded rod or another elongated element on which the guiding slider 811 can slide in a controlled manner.

The guiding slider 811 can be a simple guide within which, in turn, at least part of the cable 70, 71 slides, preferably skewed with respect to the translation direction 81a. Basically, preferably, the guiding slider 811 is suitable to convey the cable 70, 71 towards the third device 82 along a predetermined direction, for example from a sliding slot. Preferably, therefore, the guiding slider 811 defines a conveying direction 81b.

The guiding slider 811 can also be a pulley centred along the translation direction 81a and attached to the guiding support 810 so as to move along said translation direction 81a in a controlled manner.

For example, both the first and the second device 80, 81 can be mutually operatively connected also from an electronic point of view. For example, they can be connected to an electronic processor internal to the locating portion 8, or to an electronic processor external to the locating portion 8.

In any case, preferably, the second device 81 also includes control means 812 designed to move, in a controlled manner, the guiding slider 811 on the guiding support 810.

The control means 812 can be operatively connected to the aforementioned electronic processor, if present, and to the sensor of the first device 80 so as to be able to know the state of the turns of the cable 70, 71 arranged above the discoidal element 800.

In particular, preferably, the control means 812 are configured in such a way that the pitch of the guiding slider 811, i.e. the translation along the translation direction 81a, considered according to the single turn of the cable 70, 71 on the discoidal element 800, is equal to the diameter of the cable 70, 71.

In more general terms, in substance, the guiding slider 811 is suitable to transmit the detection means 7 by moving along the translation direction 81a in proportion to the release or reception of the first device 80 and also by moving along the conveying direction 81b of the detection means 7. In detail, preferably, the guiding slider 811 follows the detection means 7 on the winding surface 8b and therefore moves along the translation direction 81a integrally with the release or reception position assumed by the detection means 7 on the winding surface 8b, i.e. in a direction parallel to the axis of rotation 8a. The conveying direction 81b thus moves integrally with the guiding slider 811.

Of course, preferably, the translation of the guiding slider 811 occurs in opposite directions depending on whether the discoidal element 800 rotates in one direction, for example to receive the detection means 7, or in the other direction, for example to release the detection means 7.

Substantially, therefore, the direction of translation of the guiding slider 811 along the translation direction 81a is preferably dependent on the direction of rotation of the discoidal element 800.

For the movement of the guiding slider 810 to be proportional to the rotation of the discoidal element 800, various connection systems can be used.

In one embodiment, as already mentioned, control means 812 connected to electronic processors and sensors that detect the number of revolutions of the discoidal element 800 can be used.

Alternatively, direct systems, for example mechanical systems, can also be provided. In the preferred embodiment, the control means 812 include gears for connecting the second device 81 to the first device 80. In particular, preferably, the connecting gears are configured as described below. When the cable 70, 71 is pulled, the discoidal element 800, i.e. the reel, rotates to accommodate its unwinding; the gear operatively connected to the discoidal element 800 rotates integrally with the latter around the axis of rotation 8a, thus completing a full revolution with each unwinding turn of the cable. During the rotation of the discoidal element 800, the gear of the second device 81, which is meshed with that of the discoidal element 800, is rotated around the translation direction 81a.

When the latter rotates, it makes the guiding support 810 rotate therewith, preferably including, for example, a metric screw M4, which, like a worm screw, in turn makes the guiding slider 811 slide along the translation direction 81a, by means of the linear relationship between the thread of the screw and that of the connecting insert between the guiding slider 811 and the guiding support 810.

The guiding slider 811, with each full revolution of the discoidal element 800, advances, as already explained, preferably linearly by an amount equal to the diameter of the cable 70, 71 to be wound. This relationship prevents the windings from overlapping and keeps them constantly spaced apart. Of course, the connecting gears as described above are only one preferred embodiment. In fact, the person skilled in the art could implement different connection means provided they are suitable or configurable in such a way as to allow the guiding of the detection means 7 on the winding surface 8*b* so that the cable 70, 71 does not overlap. However, different connections are not described here because they can be easily implemented by the person skilled in the art and may include, for example, transmission systems with gears with one or more stages configured differently from those described and which allow, in any case, the guiding slider 811 to be moved in proportion to the rotation of the discoidal element 800, or of the electronic systems as previously mentioned.

In general, however, the guiding slider 811 moves along the translation direction 81*a* proportionally to the rotation of the discoidal element 800 both from the point of view of the pitch, i.e. the speed of advance, and of the direction.

The third device 82 is preferably suitable to allow the release or reception of the detection means 7 by the locating apparatus 1*b*.

It can therefore consist of a hole designed to allow the passage of the detection means 7, or other apparatuses depending on the structural configuration taken by the locating apparatus 1*b*.

For example, if the locating apparatus 1*b* consists of a frame defining a closed box, the third device 82 may be a hole possibly provided with a pulley.

Or, if the structure of the locating apparatus 1*b* is substantially open, the third device 82 can consist of a simple through slot suitable for allowing the passage of the cable 70, 71 along a correct orientation with respect to the first and the second device 80, 81.

Figures 5A, 5B, 6:
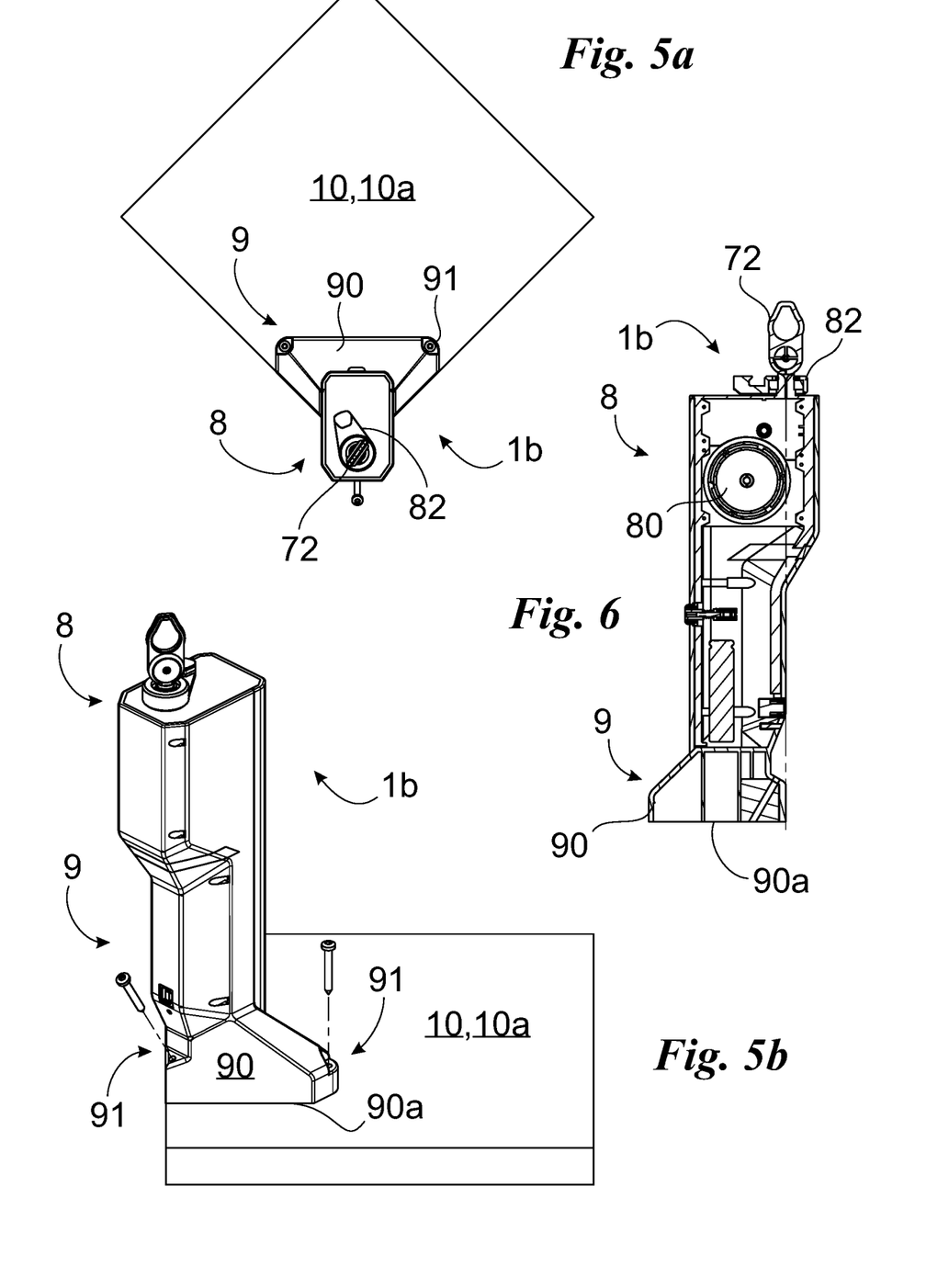
Figures 7A, 7B, 8:
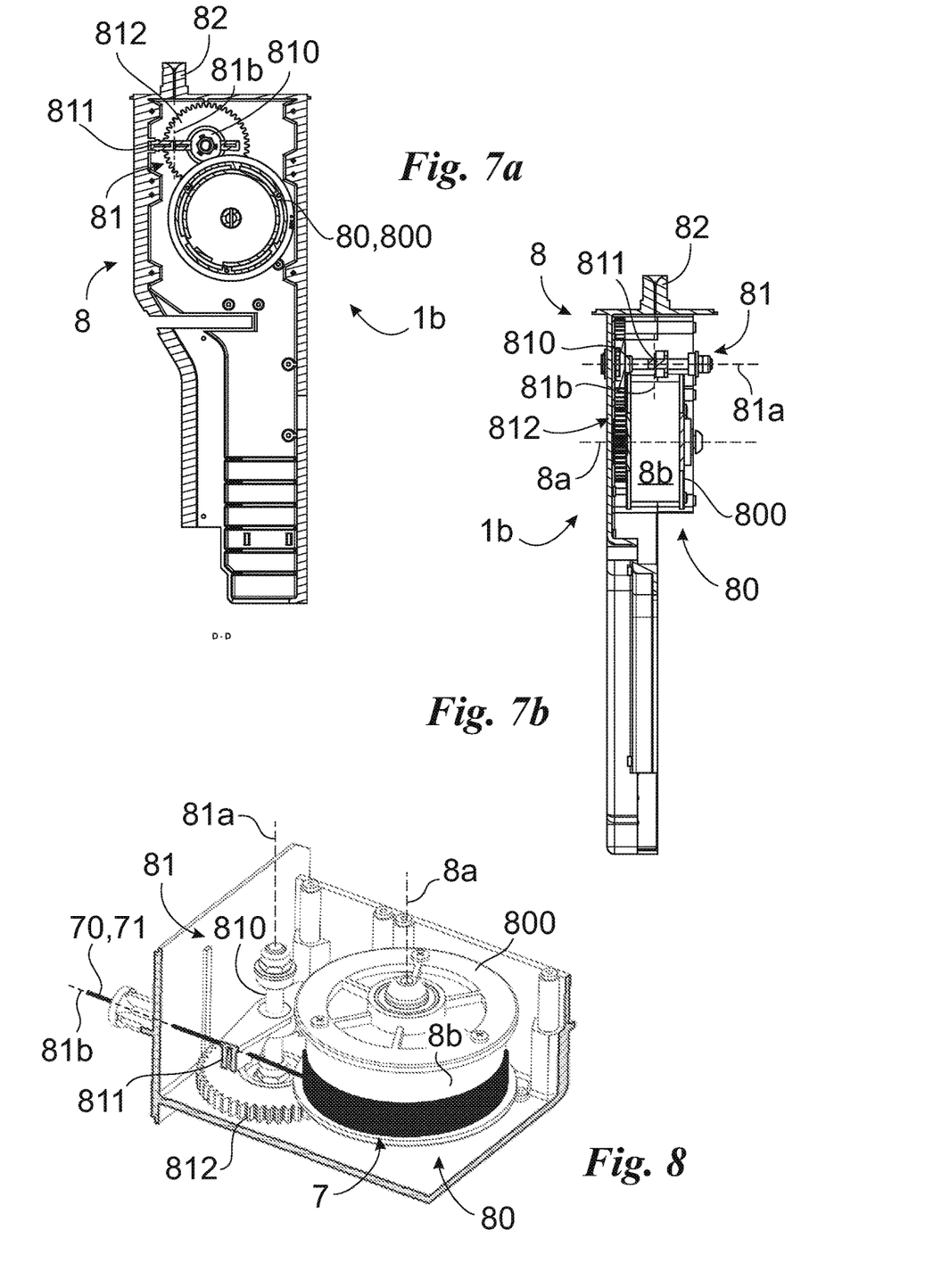

Preferably, the third device 82 includes a funnel-shaped slot at which a cable-guiding spinner is arranged in order to direct the exit of the detection means 7 from the locating apparatus 1*b* as for example shown in FIGS. 5-7.

In particular, the third device 82 is suitable to release or receive the detection means 7 to or from the detection apparatus 6 of the machine tool 1*a*.

Therefore, the machine tool 1*a* and at least one locating apparatus 1*b* are connected together by the detection means 7.

The operation of the tool system 1, previously described in structural terms, is as follows.

In particular, when the locating apparatus 1*b* is fastened to the machining surface 10*a* and the machine tool 1*a* moves above it, the positions adopted by the machine tool 1*a* above the machining surface 10*a* can be assessed by means of an electronic processor communicating with the machine tool 1*a* and the locating apparatus 1*b*.

An important aspect to consider for the movement of the machine tool 1*a* is that, in the absence of locating apparatuses 1*b*, the movement in the reference system of the machine tool 1*a* can be assessed, but no reference is given with respect to the object 10.

Assuming, for example, to place the machine tool 1*a* above a rectangular machining surface 10*a*, it is possible to define the reference system of the object in the external electronic processor.

To do this, it is possible to follow different procedures which are partially described below.

For example, it is possible to arrange a machine tool 1*a*, preferably equipped with at least one detection apparatus 6, above the machining surface 10*a*.

It is therefore possible to arrange two locating devices 1*b* above the surface at its vertices by using the base 90.

It is also possible to attach the locating apparatus 1*b* to the object 10 by using the locking means 91.

Once the locating apparatuses 1*b* have been attached, it is possible to connect, by means of the attaching means present on the elements 60, 61, the detection means 7, for example the first or the second cable 70, 71, respectively from two locating apparatuses 1*b*, to the machine tool 1*a*.

However, advantageously, before connecting the locating apparatuses 1*b* to the machine tool 1*a*, the locating apparatuses 1*b* can be temporarily attached to one another.

In particular, preferably, it is sufficient that the detection means 7 of one of the two locating apparatuses 1*b* are attached to the other locating apparatus 1*b* at the third device 82.

In order to guarantee this attachment, the third device 82 can include components suitable for allowing the attaching portion 72 to be attached to the third device 82. For example, the latter can also define a protuberance for the insertion of the attaching portion 72 thereon.

Preferably, in addition to the aforementioned features, the attaching portion 72 of the detection means 7 does not have the sole purpose of attaching the locating apparatus 1*b* to the machine tool 1*a*, but also that of locking the free end of the detection means 7 at the third device 82 so as to keep the detection means 7 always usable by the user and in such a way as to determine a starting position or "zero" position for the first and the second device 80, 81.

Therefore, preferably, in the preferred embodiment, the third device 82 defines a hole with dimensions greater than the diameter of the cable 70, 71 but smaller than the attaching portion 72, so that the latter locks the free end of the detection means 7 on the third device 82.

Figure 9:
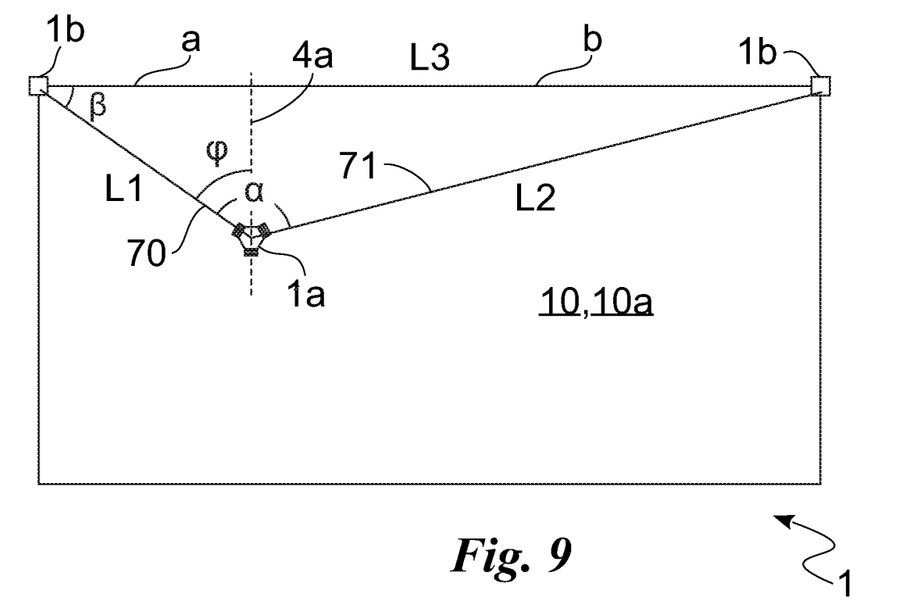
FIG. 9 is a top view of the tool system according to the invention when measuring along the long side of a rectangular object.
Figure 10:
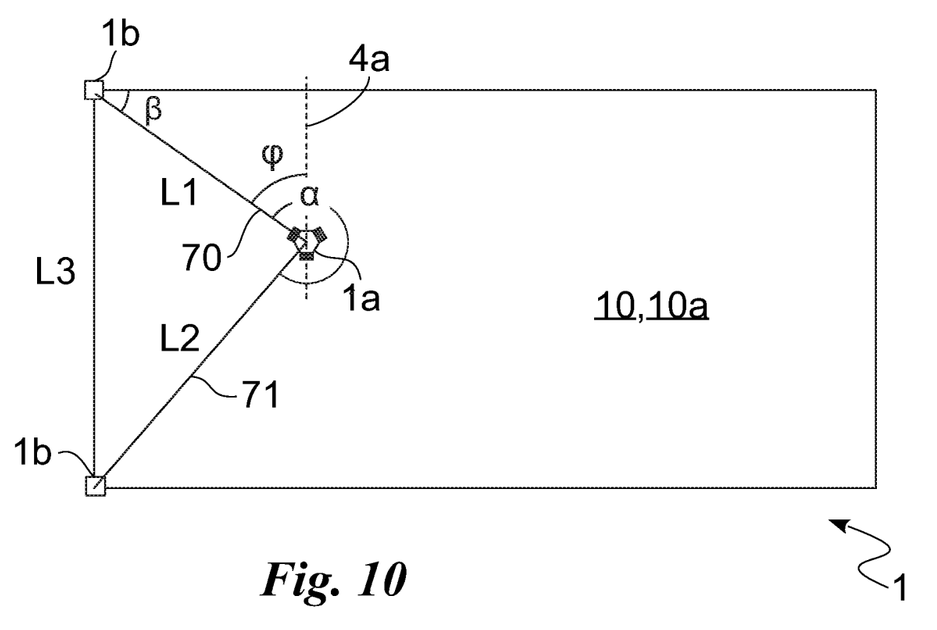
FIG. 10 is a top view of the tool system according to the invention when measuring along the short side of a rectangular object.

Thanks to the connection of the locating apparatuses 1*b* it is therefore possible to identify the distance L3 between the locating apparatuses 1*b* on the object 10, or better said, on the machining surface 10*a*.

Subsequently, when both the locating apparatuses 1*b* are connected to the machine tool 1*a* through the detection means 7, the amount of cable 70, 71 released by the first device 80 of each locating apparatus 1*b* is recorded so as to identify the distances L1, L2 between the machine tool 1*a* and the locating apparatuses 1*b*.

L1 and L2, for example, preferably correspond to the distances defined by the extraction of the first cable 70 and/or the second cable 71, respectively, from the respective locating apparatuses 1*b*.

Thanks to the third element 62 present on each detecting apparatus 6 it is possible to know the orientation of the direction of unwinding of the detection means 7 with respect to the predetermined orientation 4*a* of the machine tool 1*a*.

In particular, preferably, in the preferred configuration, the third element 62 allows the angle $\varphi$ to be defined. Of course, by adding the angles $\varphi$ detected by the first and the second element 60, 61 with respect to the third element 62, it is also possible to indirectly deduce the angle $\alpha$ between the direction of the first cable 70 and the second cable 71.

It is therefore possible to know the position of the machine tool 1*a* relative to the reference system of the machining surface 10*a*, and in particular, of the locating apparatuses 1*b*. Preferably, in order to tension the detection means 7, the machine tool 1*a* must preferably be moved along at least one direction and subsequently all the data relating to the distances L1, L2, L3 and the angles $\varphi$ and $\alpha$ must be measured.

Furthermore, once L1, L2 and a are known, it is possible to use Carnot's theorem, or the cosine theorem, to find the dimensional value L3 of the distance between the locating apparatuses 1b and, in this case, of the side, or dimension, of the object 10, in particular with reference to the machining surface 10a.

In this way, by comparing the L3 values found by means of the calculations and the nominal heat obtained by direct measurement between the locating apparatuses 1b, it is possible to check whether there are any measurement errors that can be remedied by moving the machine tool 1a and carrying out the measurement steps again.

Starting from the data found, it is therefore possible to determine any quantity connected to the position of the machine tool 1a on the object 10, such as the angle β between L3 and L1, and therefore the actual coordinates a, b of the machine tool 1a relative to the reference system referred to the object 10. These coordinates can substantially coincide with the projections of the distances L1 and L2 on L3.

Below are some examples of calculations that can be carried out, by means of an electronic processor, on the basis of the reasoning just described:

$$L3 = \sqrt{L1^2 + L2^2 - 2L1L2\cos\alpha}$$

$$\beta = \sin^{-1}\left(\frac{L2}{L3}\sin\alpha\right)$$

$$a = L1\cos\beta$$

$$b = L1\sin\beta$$

Once the position of the machine tool 1a with respect to the two vertices of the machining surface 10a has been detected, it is possible, for example, to disconnect one of the two locating apparatuses 1b from the machine tool 1a, move this apparatus 1b to another vertex and start again with the procedure described above.

In this way, it is therefore possible to determine all the dimensions of the machining surface 10a, for example especially if it is rectangular or in any case with a regular geometry, and define the coordinates and the relative positioning between the machine tool 1a and the reference system referred to the object 10. Obviously, the indicated procedure is not strictly linked to the shape of the object 10. The latter can also have a non-rectangular surface and the locating apparatuses 1b can in any case be arranged at predetermined fixed points on the machining surface 10a so as to allow the machining thereon by the machine tool 1a.

The locating apparatuses 1b can allow the mapping of any object 10 or machining surface 10a.

As an alternative to the above, the machine tool 1a can contain a plurality of detection apparatuses 6, and more conveniently, a number corresponding to the number of locating apparatuses 1b used, with a number even higher than two.

If, for example, the machining surface 10a is rectangular, it is therefore possible to use three locating apparatuses 1b, and therefore it is no longer necessary to carry out two procedural steps, but it is possible to define the position of the machine tool 1a in the same step by using the logic expressed above.

The object 10, in particular the machining surface 10a, can have different shapes from the rectangular shape used by way of example.

For example, the machining surface 10a can take different regular shapes, or irregular or curvilinear shapes in and out of the plane.

In such cases, it is possible to use a different number of locating apparatuses 1b and different formulas and logics that take into account the possible geometry of the machining surface 10a in use.

For example, the electronic processor, which is designed to interpret the data from the locating apparatus(es) 1b and the machine tool 1a, allows the implementation of calculation methods that take into account the curvilinear coordinates or different and selectable geometries.

The entire description above has been dealt with considering the dimensions along a plane parallel to the machining plane 10a, and for this reason it is preferably assumed that the locating apparatus 1b is configured in such a way as to release or receive the detection means 7 starting, in particular, from the third device 82 at the same height, with respect to the machining surface 10a, at which the detection apparatus 6 is placed on the machine tool 1a arranged on the same machining surface 10a.

However, for example due to the irregularity or curvature of the machining surface 10a, the detection apparatus 6 and the third device 82 may not lie in the same plane parallel to the machining surface 10a. Therefore, the cables 70, 71 could be skewed with respect to that plane and inclined.

To obviate this last hypothesis, the locating apparatuses 1b could include sensors designed to detect the angle of release of the detection means 7 starting from the third device 82 with respect to the supporting surface 90a, or tracking means suitable to arrange, on command or automatically, the cables 70, 71 in the plane parallel to the machining surface 10a, could be provided. For example, in this respect, the locating apparatuses 10b could include a movable pulley downstream of the third device 82, and in the measurement steps it could be appropriate to calibrate the tracking means before the subsequent measurements.

The invention therefore defines a machining method of said tool system 1, which includes a new localization method.

The machining method therefore comprises the new localization method and a removal step wherein the movement means 3 move the machine tool 1a along the removal path 2a and the removal tool 2 removes material from the object 10 along the path 2a.

The localization method includes at least a step of preparing the tool system 1a and a step of acquiring the position of the machine tool 1a on the machining surface 10a.

The preparation step preferably comprises a positioning step wherein the machine tool is placed on the machining surface 10a and at least one locating apparatus 1b is arranged along fixed points preferably defined along the machining surface 10a of the object 10. Preferably, in this step, the locating apparatus 1b can be arranged at the perimeter of the object. Even more conveniently, at least two locating apparatuses 1b are positioned on the machining surface 10a during the preparation step.

The preparation step also includes a first connection step. In the first connection step, the locating apparatuses 1b are preferably mutually connected by means of the detection means 7 of at least one of the two locating apparatuses 1b. In this way, the distance L3 between the two locating apparatuses 1b is obtained directly.

At the same time, if for example the first cable 70 is used between the two detection apparatuses 1b, the second cable 71 can also be used to detect the distance between the two locating apparatuses 1b in such a way as to verify the accuracy of the datum obtained from the first cable 70, or it can already be attached to the machine tool 1a, or still, not even used.

Furthermore, the preparation step includes a second connection step wherein the detection means 7 connect each locating apparatus 1b and the machine tool 1a.

In particular, as mentioned, the detection means 7 are released, for example thanks to the intervention of a user, from the first device 80 in a manner controlled by the second device 81 and are connected to the machine tool 1a.

Preferably, as already mentioned, the third device 82 of the machining apparatus 1b is preferably arranged at the same height as the detection apparatus 6 in such a way that the cables 70, 71 substantially remain in a plane parallel to the machining surface 10a, for example if the machining surface 10a is flat. However, as an alternative to what has already been described, some parameters may also be provided within the external electronic processor such as to correct any misalignments and correctly assess the distance between the machine tool 1a and the locating apparatus 1b.

The definition of the path 2a can be performed by the external electronic processor following the localization of the machine tool 1a on the machining surface 10a.

The machine tool 1 is then ready to carry out the next step.

The step of acquiring the position of the machine tool 1a with respect to at least one locating apparatus 1b then begins.

During the acquisition step, the machine tool 1a preferably carries out a movement step wherein it travels along a predetermined path 2a, for example a straight segment, defining the localization point of at least one locating apparatus 1b, preferably at least two locating apparatuses 1b.

Furthermore, in the acquisition step, an electronic processor preferably carries out a processing step wherein it receives data relating to position, distances and angles from the locating apparatus 1b and the machine tool 1a.

In particular, in this step, the processor processes at least the data relating to the distance L1, L2 between the machine 1a and at least one apparatus 1b coming from the locating portion 8, more in detail from the first device 80, and the data relating to the predetermined orientation 4a of the machine 1a coming from the control unit 5, more in detail from the detection apparatus 6.

Preferably, the processor detects the aforementioned data relating to at least two locating apparatuses 1b connected to a machine tool 1a so as to locate, as previously described, the position and orientation of the machine tool 1a with respect to the reference system of the object 10, i.e. relative to the latter.

An assessment step can be included in the acquisition step. In the assessment step, the data from direct empirical measurement, for example the distance L3 calculated in the first connection step, with the distances deduced numerically from the measured data, such as the distance L3 deduced thanks to Carnot's theorem, can be compared. In this way, the deviation between the two distances L3 obtained with different, direct and indirect methods is assessed.

In the assessment step, threshold error or tolerance values, beyond which the system may not allow the subsequent removal step or can send alert signals to the user, can be provided and preset in an external computer program. Basically, the system 1 allows data redundancy such as to guarantee high precision and reproducibility of this precision in the step of detecting the position of the machine tool 1a on the machining surface 10a.

At the end of the localization step, preferably, the removal step begins, wherein the movement means 3 move the machine tool 1a along the removal path 2a while, almost simultaneously, the removal tool 2 removes material from the object 10 along the path 1a, thus carrying out the machining.

In detail, in the removal step, the unit 5, depending on the commands provided by a user through an electronic processor, activates/deactivates the drive wheels by varying the advance of the machine tool 1a in accordance with the path 2a.

For example, if the removal path 2a comprises a straight section almost parallel to one of the main axes of rotation 3a, the unit 5 commands the stopping of the wheel with the axis parallel to said direction and a concordant and equal-modulus rotation of the remaining wheels; whereas, if the path includes an arched section, the control unit 5 commands a discordant and equal-modulus rotation of two wheels, while leaving the third stationary.

Once the removal step has been completed, the machining process can end, or alternatively comprise an additional removal step wherein the movement means 3 move the machine tool 1a at least one more time along the removal path 2a, and the removal tool 3 removes, at least a second time, material from the object 10 along the path 2a, thus increasing the thickness of the material removed and preferably cutting the object 10.

Finally, it should be noted that, during the removal or the additional removal step, the movement of the machine tool 1a can be performed manually by the operator thanks to the handles optionally provided on the case 4.

The locating system for a machine tool and the localization method provided by said system according to the invention achieve important advantages.

A first important advantage of the system 1 is that it is able to allow the machine tool 1a to perform a machining process on any surface extension, taking into account the geometry of said surface.

In fact, the invention allows the position of the machine tool 1a relative to the object 10 being machined to be detected, and it is therefore possible to provide the machine tool 1a with instructions in real time and with absolute precision with respect to the machining surface 10a.

Furthermore, as it is positioned on the object 10 and able to move without limitations along the entire machining surface 10a, it is capable of machining substantially unlimited surfaces. This possibility is denied in known machines where the machining stroke is limited by the stroke of the workpiece holder table and/or of the spindle.

Another advantage is represented by the reduced dimensions of the system 1 and the high versatility of the same, which therefore constitutes an innovative small and transportable tool that can be used in any place, to create large-sized products.

Another advantage is that the tool system 1, by following a removal path 2a which can be controlled by an external processor, is able to perform a very precise and accurate machining.

Another advantage is that, since it is possible to perform several passes always along the same identical path 2a, it is also possible to perform cutting operations.

An important advantage, especially with respect to known numerical control machines, can be identified in the fact that the tool system 1 can also be used by an operator without specific knowledge.

Not the least advantage of the tool system 1 is the simplicity of construction which gives the tool system 1 a reduced purchase and maintenance price.

In conclusion, a further advantage of the invention is that the system and the related localization method allow the position of the machine tool on the object to be assessed with high precision and reproducibility of the measurements, while being able to verify the presence of any measurement errors which may subsequently lead to machining errors.

In this regard, therefore, the invention increases the overall machining efficiency of the machine tool.

The invention is susceptible of variations falling within the scope of the inventive concept as defined by the claims.

In this context, all details can be replaced by equivalent elements, and the materials, shapes, and dimensions may be any materials, shapes, and dimensions.

The invention claimed is:

1. A locating system for machine tools comprising:
    a machine tool suitable for working on a machining surface of an object by removing material and including a tool, movement means suitable to be placed in direct contact with said machining surface and for moving said machine tool and, therefore, said tool with respect to said object while said tool works on said object,
    at least two locating apparatuses each including a supporting portion suitable to be placed at a fixed point on said machining surface, detection means comprising a first cable or a second cable designed to connect said at least two locating apparatuses to said machine tool, and a locating portion configured to release or receive said first cable or said second cable in such a way as to measure a distance detected between said machine tool and said at least two locating apparatuses,
    wherein said detection means being configured to allow mutual connection of said at least two locating apparatuses in such a way as to allow a direct measurement of a distance between said at least two locating apparatuses, and
    said distance between said at least two locating apparatuses being further obtainable indirectly from the distance between said machine tool and said at least two locating apparatuses.

2. The locating system according to claim 1, wherein said supporting portion comprises a base defining a supporting surface compatible with said machining surface and locking means configured to attach the supporting portion to said object at said base and said machining surface, respectively.

3. The locating system according to claim 2, wherein said locating portion comprises a frame, a first device, a second device and a third device, said devices being attached to said frame and mutually connected by said detection means,
    said first device being suitable for releasing or receiving said first cable or said second cable in opposition to or pushed by an elastic element,
    said second device comprising a cable winder, for winding said first cable or said second cable, comprising a guiding support and a guiding slider, and
    said third device being suitable for allowing the release or reception of said first cable or second cable by at least two locating apparatuses towards said machine tool.

4. The locating system according to claim 2, wherein said first device comprises a discoidal element defining an axis of rotation and a winding surface, said discoidal element rotating around said axis of rotation with respect to said frame in such a way as to wind or release said first cable or said second cable on said winding surface, and said winding surface extending around said axis of rotation and being configured to prevent said first cable or second cable from overlapping on said winding surface.

5. The locating system according to claim 1, wherein said locating portion comprises a frame, a first device, a second device and a third device, said devices being attached to said frame and mutually connected by said detection means,
    said first device being suitable for releasing or receiving said first cable or said second cable in opposition to or pushed by an elastic element,
    said second device comprising a cable winder, for winding said first cable or said second cable, comprising a guiding support and a guiding slider, and
    said third device being suitable for allowing the release or reception of said first cable or said second cable by said at least two locating apparatuses towards said machine tool.

6. The locating system according to claim 1, wherein said first device comprises a discoidal element defining an axis of rotation and a winding surface, said discoidal element rotating around said axis of rotation with respect to said frame in such a way as to wind or release said first cable or second cable on said winding surface, and said winding surface extending around said axis of rotation and being configured to prevent said first cable or second cable from overlapping on said winding surface.

7. The locating system according to claim 1, wherein said machine tool comprises a case suitable for supporting the components of said machine tool and defining a predetermined orientation of said machine tool and a detection apparatus configured to attach at least part of said detection means, defining a first axis and including a shaft centered along said axis, a first element movably attached to said shaft and suitable for being moved integrally with said first cable defining an angle between said predetermined orientation and said first cable, and a second element movably attached to said shaft and suitable for being moved integrally with said second cable defining another angle between said predetermined orientation and said second cable.

8. The locating system according to claim 1, wherein said detection apparatus comprises a third element adapted to detect said angle between said first cable or said second cable and said predetermined orientation, and including at least two portions adapted to move integrally with said case and with at least one element selected from said first element and said second element so as to determine said angle between said predetermined orientation and at least one cable selected from said first cable and said second cable.

9. The locating system according to claim 1, wherein said detection means comprise an attaching portion arranged at a free end of at least one of said first cable and said second cable, and configured to be attached both to said machine tool at said detection apparatus and to said at least two locating apparatuses at said third device, said attaching portion being further suitable for blocking the free end of said first cable or second cable at said third device in such a way as to define a starting position for said first and said second device.

10. A method for operating the locating system according to claim 1, comprising:
a preparation step for preparing the locating system including:
    a positioning step, in which said machine tool and said at least two locating apparatuses are placed on said machining surface,
    a second connecting step in which said machine tool is connected to each of said at least two locating apparatuses by said detection means, and
    an acquisition step for acquiring a position of said machine tool on said machining surface with respect to said at least two locating apparatuses by said detection means in which the distance detected between said machine tool and said at least two locating apparatuses are measured, and wherein said preparation step includes a first connection step in which said at least two locating apparatuses are mutually connected by said detection means so as to allow the direct measurement of the distance between said at least two locating apparatuses.

11. The method according to claim 10, wherein said locating system is operatively connected to an external electronic processor configured to receive and process data from said locating system, and said acquisition step includes an assessment step in which said distance measured between said locating apparatuses during said first connection step is compared by said electronic processor with said distance measured during said acquisition step so as to assess the difference between said distances.

12. A method for operating the locating system according to claim 1, including a locating method comprising:
 a preparation step for preparing the locating system including
  a positioning step, in which said machine tool and said at least two locating apparatuses are placed on said machining surface,
  a second connecting step in which said machine tool is connected to each of said at least two locating apparatuses by said detection means, and
  an acquisition step for acquiring the position of said machine tool on said machining surface with respect to said at least two locating apparatuses by said detection means in which the distance detected between said machine tool and said at least two locating apparatuses are measured, and
 wherein said preparation step includes a first connection step in which said at least two locating apparatuses are mutually connected by said detection means so as to allow the direct measurement of the distance between said at least two locating apparatuses, and
 a removing step, in which said movement means move said machine tool and in which said removal tool removes material from said object along a path.

13. The locating system according to 4, wherein said machine tool comprises a case suitable for supporting the components of said machine tool and defining a predetermined orientation of said machine tool and a detection apparatus configured to attach at least part of said detection means, defining a first axis and including a shaft centered along said axis, a first element movably attached to said shaft and suitable for being moved integrally with said first cable defining an angle between said predetermined orientation and said first cable, and a second element movably attached to said shaft and suitable for being moved integrally with said second cable defining another angle between said predetermined orientation and said second cable.

* * * * *